United States Patent [19]

Krauss

[11] 4,290,412
[45] Sep. 22, 1981

[54] SOLAR COLLECTOR AND PROCESS FOR ITS OPERATION

[75] Inventor: Ralf Krauss, Palma de Mallorca, Spain

[73] Assignee: Walter Steinrücke, Cologne, Fed. Rep. of Germany

[21] Appl. No.: 8,126

[22] Filed: Jan. 31, 1979

[30] Foreign Application Priority Data

| Apr. 2, 1978 [DE] | Fed. Rep. of Germany | 2804746 |
| Apr. 2, 1978 [DE] | Fed. Rep. of Germany | 2804863 |
| Oct. 6, 1978 [DE] | Fed. Rep. of Germany | 2825509 |

[51] Int. Cl.³ .......................... F24J 3/02; F28F 13/00
[52] U.S. Cl. .................................. 126/419; 126/445; 126/450; 165/136
[58] Field of Search ............... 126/444, 443, 445, 450, 126/449, 446, 424, 419, 422; 417/14, 148; 165/135, 136

[56] References Cited

U.S. PATENT DOCUMENTS

| 1,946,184 | 2/1934 | Abbot | 126/424 |
| 2,595,905 | 5/1952 | Telkes | 126/419 |
| 3,174,915 | 3/1965 | Golin | 126/444 |
| 3,270,802 | 9/1966 | Lindberg | 165/135 |
| 3,675,023 | 7/1972 | Kunke et al. | 126/419 |
| 3,860,055 | 1/1975 | Wild | 126/419 |
| 3,916,871 | 11/1975 | Estes et al. | 126/444 |
| 4,016,861 | 4/1977 | Taylor | 126/449 |
| 4,038,965 | 8/1977 | Lyon | 126/446 |
| 4,061,132 | 12/1977 | Ashton et al. | 126/419 |
| 4,069,811 | 1/1978 | Tabor | 126/446 |
| 4,078,548 | 3/1978 | Kapany | 126/449 |
| 4,088,119 | 5/1978 | O'Hanlon | 126/419 |
| 4,142,509 | 3/1979 | Hermann et al. | 126/419 |
| 4,153,037 | 5/1979 | Isaacson | 126/449 |
| 4,154,222 | 5/1979 | Yu | 126/449 |
| 4,177,795 | 12/1979 | Schultz | 126/419 |
| 4,185,616 | 1/1980 | Johnson | 126/444 |
| 4,191,165 | 3/1980 | Faudarole | 126/445 |
| 4,203,425 | 5/1980 | Clark | 126/445 |

Primary Examiner—Daniel J. O'Connor
Attorney, Agent, or Firm—Neil F. Markva

[57] ABSTRACT

The invention relates to a solar collector assembly comprising a hollow housing body that is at least partially transparent. An absorber means is contained in the housing and a vacuum pump means is connected to the housing. A particular process of operating the solar collector assembly also forms a part of this invention.

Solar collector assemblies are used for converting sun energy into other forms of energy such as heat used to prepare hot water or heat for energy production. Many attempts have been made to design solar collectors having a compact structural shape and satisfactory efficiency to render them suitable as an energy source in dwelling houses. However, such a solar collector has not yet been attained.

31 Claims, 11 Drawing Figures

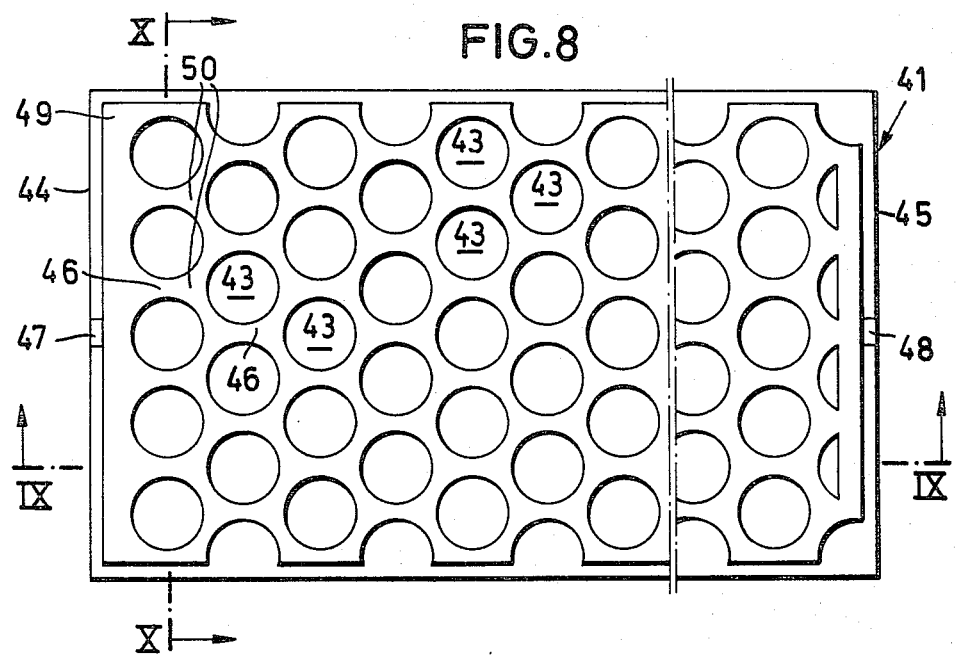
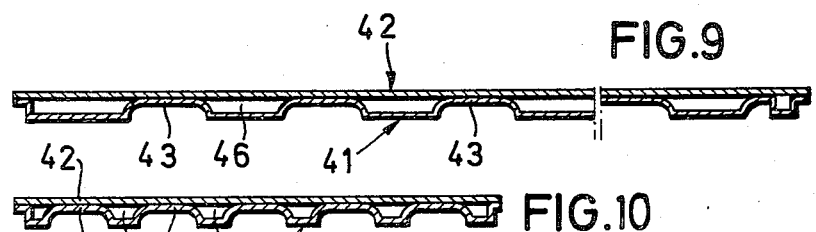
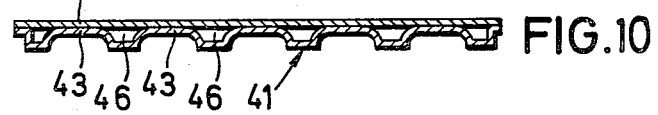
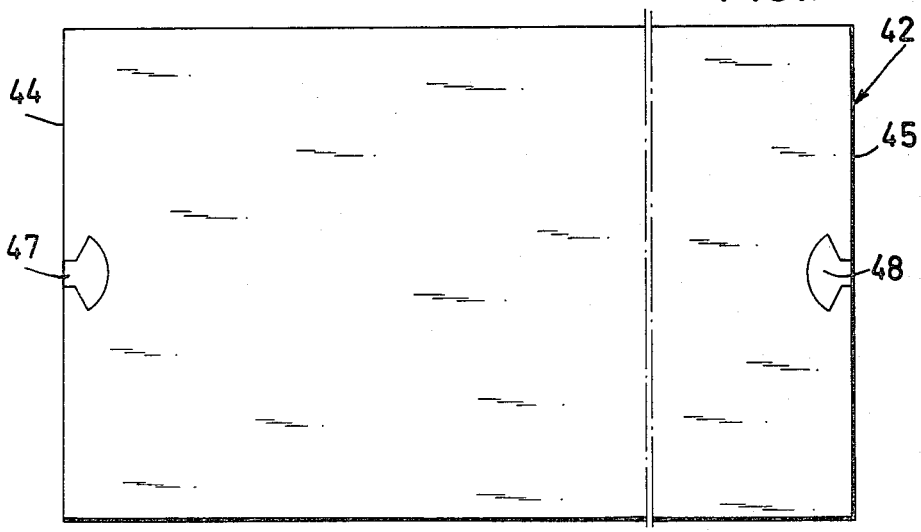

SOLAR COLLECTOR AND PROCESS FOR ITS OPERATION

BACKGROUND OF THE INVENTION

Known solar collector assemblies include a box-type bottom portion made of sheet metal and having an upper aperture closed by a glass plate. An absorber is disposed in the sheet metal housing. An insulating material such as foamed styrene, glass wool or the like is located between the absorber and the bottom of the sheet metal housing. Such collectors are referred to as mono-cover single collectors. These prior art collectors are not well suited for dwelling houses because of the considerable height resulting from the inclusion of the insulating packages required to prevent heat loss in a downward direction. It is not possible to reduce the height of the prior art structure without sacrificing the insulating effect. Furthermore, this type of collector has a relatively large weight constituting a further disadvantage. Moreover, the high edge of the box-type sheet metal housing throws shadows over a large part of the absorber inside the housing. Thus, the efficiency of the absorber is reduced and the output of the collector is insufficient when an angular incidence of the sun rays occurs to produce these shadows. With the prior art collectors, the sun energy is effectively converted into heat only when there is a relatively vertical incidence of sun radiation. Without insulation on the upper side of the collector, there is a further restrictive effect upon the efficiency and output of the prior art solar collector assemblies.

The known double cover solar collector is identical to the mono-cover single collector with respect to the box-type sheet metal housing and the required thick insulating package. In this collector, however, two glass covers are superimposed in spaced relationship with respect to each other forming an air cushion between them. This configuration reduces the amount of thermal loss of the absorber in upward direction to obtain a heat storage in the absorber when solar radiation decreases. The double cover collector involves the same disadvantages in its structure and use as the mono-cover single collector.

The solar collector disclosed in U.S. Pat. No. 3,916,871 discloses the use of a vacuum pump connected to the hollow body containing the absorber. The vacuum pump is used to evacuate the hollow body from time to time and maintain a constant pressure level. The vacuum in the hollow body insulates the absorber to thereby eliminate the necessity for insulating packages thus permitting the construction of the solar collector with a more compact structural configuration.

SUMMARY OF THE INVENTION

The primary object of the invention is to operate a solar collector having an absorber disposed within a housing connected to a vacuum pump having a means for controlling the vacuum within the collector to correspond to the prevailing conditions of thermal radiation and to the prevailing demand of heat of the consumer while an optimum output of the absorber is obtained.

Another object of the invention is to provide a solar collector having suitable constructional shapes to permit its assembly in dwelling houses and the like.

A further feature of the invention is to provide a particular structural configuration of an absorber useful in obtaining a greater efficiency of solar collector assemblies through the control of flow conditions of the fluid medium traveling through the absorber.

The solar collector assembly of the present invention comprises a hollow housing at least partially transparent to solar rays. Absorber means are disposed in the housing to receive the solar rays. Vacuum pump means are connected to the housing to evacuate the inside of the housing. Means are provided for controlling the amount of vacuum in the housing in correlation with prevailing ambient atmospheric conditions. A particular feature of the invention provides for the controlling means to automatically adjust the vacuum within the housing in response to changes in the prevailing ambient atmospheric conditions. Various features of the invention are disclosed herein as effective portions of the solar collector assembly.

The process according to the invention herein is for operating a solar collector including a hollow housing containing an absorber with the housing being connected to a vacuum pump. The process comprises the steps of adjusting the amount of vacuum in the housing up to its complete cancellation. The adjusting step is maintained in correlation with prevailing ambient atmospheric conditions. The adjusting of the vacuum is therefor effective to control the efficiency of the function of the absorber disposed within the hollow housing of the solar collector.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 8 is a plan view of a bottom plate of the absorber in a solar collector made in accordance with this invention;

FIG. 9 is a sectional view along line IX—IX of FIG. 8 having a mounted cover plate thereon;

FIG. 10 is a sectional view along line X—X of FIG. 8 with a mounted cover plate thereon; and FIG. 11 is a plan view of the cover plate as shown in FIGS. 9 and 10.

DETAILED DESCRIPTION

Figure 1:
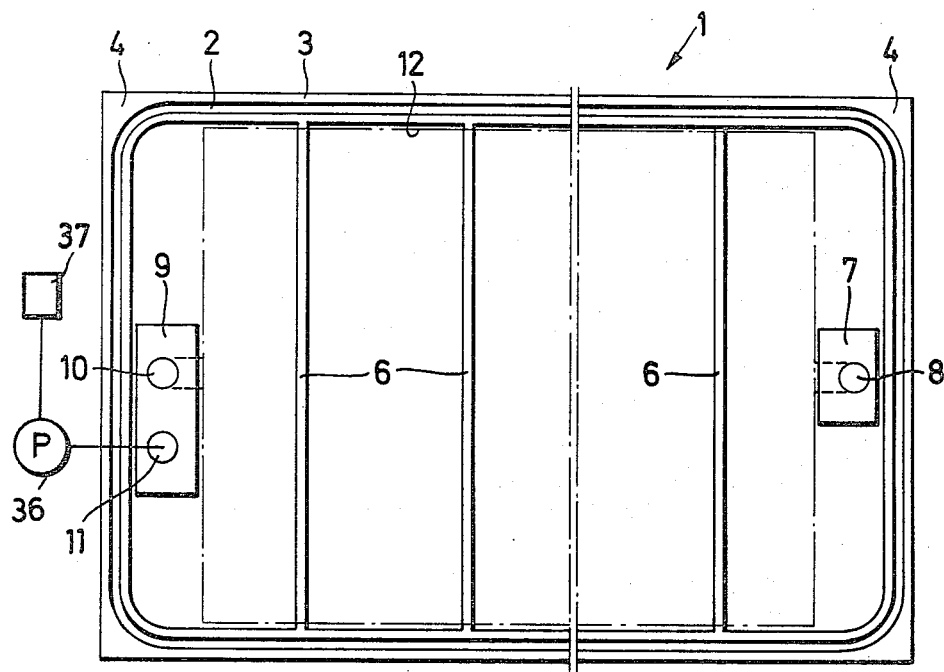
FIG. 1 is a plan view of the cup-shaped bottom portion of a solar collector made in accordance with this invention.
Figure 2:
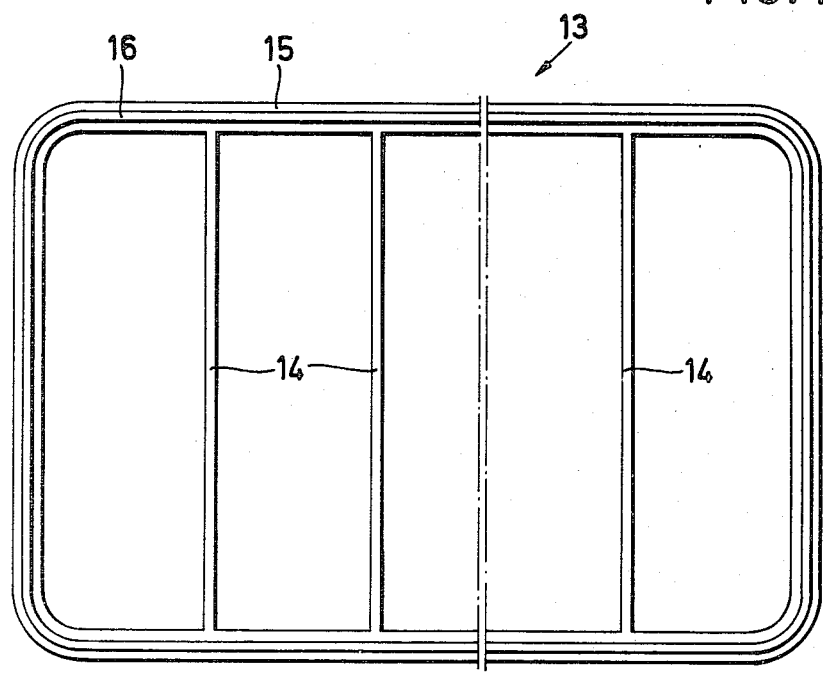
FIG. 2 is a top plan view of the cup-shaped cover portion of the collector of FIG. 1.
Figure 3:
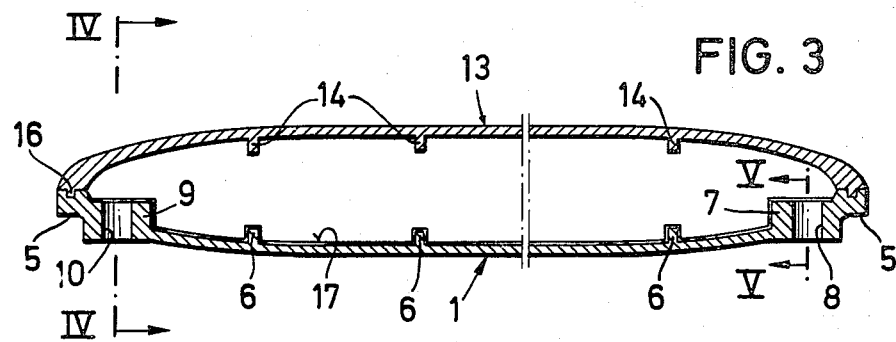
FIG. 3 is a longitudinal sectional view of the solar collector composed of the cup-shaped bottom portion and the cup-shaped cover portion.
Figure 4:
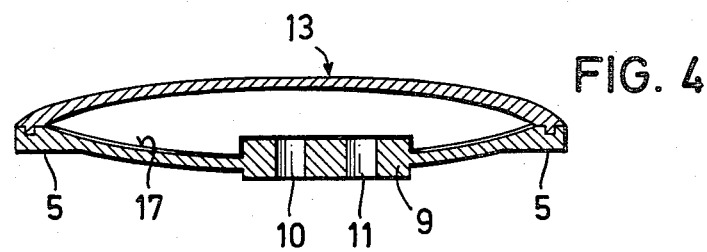
FIG. 4 is a cross-sectional view along the line IV—IV of FIG. 3.
Figure 5:
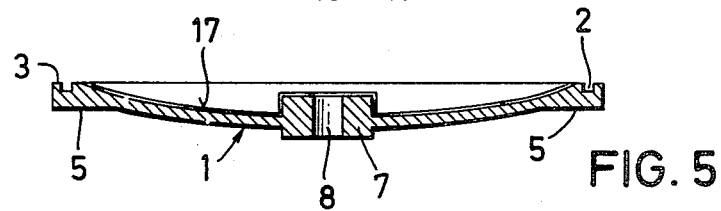
FIG. 5 is a cross-sectional view along line V—V of FIG. 3.

Referring to FIGS. 1 through 5, a solar collector includes a bottom portion, generally designated 1, and a cover portion, generally designated 13. Bottom portion 1 may be made of glass such as acrylic glass or of metal and has a substantially rectangular shape in plan view and be cup-shaped in cross-section. The cup-shaped cross-section is shallow and free of edged corners. A peripheral groove 2 is located around the edge of bottom portion 1. A supporting edge 3 is extended at corners 4 to facilitate assembly of the solar collector.

As noted, bottom portion 1 may be made of metal or any transparent material. When glass or transparent material is used, bottom portion should have a reflecting internal face. When bottom portion 1 is composed of metal, the reflectivity of a polished face will provide the necessary reflecting characteristics. A reflective coating 17 is shown on bottom plate 1 in this first embodiment.

A supporting edge 5 is located at the under side of bottom portion 1 and is straight in cross-section without a curvature. Transverse ribs 6 extend along the inner surface of bottom portion 1 to allow the walls to be made as thin as possible in cross-section.

An opening 8 is located in a reinforced zone 7 at one end of bottom portion 1 and two openings or apertures 10 and 11 are located in a broader reinforced zone 9 at the other end thereof. An absorber (not shown) is placed into cup-shaped bottom portion 1 and includes an output or outlet extending through opening 8 and an input or inlet extending through opening 10. A vacuum pump (not shown) may be connected to the absorber through opening 11 and incorporate an adjustment means for controlling the pressure within the absorber. This connection may be as shown in conjunction with the embodiment of FIG. 6.

Cover portion 13 conforms to bottom portion 1 in that it is rectangular and has a flat, cup-shaped cross section reinforced by transverse ribs 14. A continuous peripheral rib 16 is located along its outer edge 15 and fits into peripheral groove 2 of bottom portion 1 when assembled to form the flat hollow body of the solar collector made in accordance with this invention. The engaged peripheral rib 16 and peripheral groove 2 may be bonded to each other to obtain a vacuum proof connection between the bottom portion 1 and top cover 13. The absorber disposed therein is mounted contactlessly to all sides of the hollow body of this collector.

The shallow cup-shaped cross section of the solar collector body permits its integration into the roof membrane of a building. The resulting flat hollow body is free of any corners. Thus, the bottom portion 1 has no high edges so that the absorber housed within the double shell collector body is fully exposed at any point on its surfaces by the sun rays even when at an extreme inclined degree of radiation. Furthermore, the disclosed structure prevents overshadowing or reflection and the output of the absorber disposed within the hollow body collector is always at optimum efficiency. It is important that a certain curvature is associated with both the bottom portion 1 and top cover portion 13 to enable them to catch the pressure acting from the outside even if the walls of the body are relatively thin. The straight or flat supporting edge 5 facilitates the assembly of the solar collector onto an under frame or the like structure.

The solar collector of this invention designed as flat hollow body is supplied and assembled with the interior thereof at ambient pressure. With vacuum pump 36 attached to the vacuum connection opening 11, it is possible to achieve the desired evacuation of the solar collector at any desired moment. The vacuum may be increased to any amount or completely eliminated thereby controlling the efficiency of the solar collector.

There is very little danger of implosion with respect to the structure of the solar collector while operating under vacuum conditions. Control means 37 may be used to automatically control vacuum pump 36 to maintain the appropriate environment inside the solar collector with respect to the prevailing conditions outside the collector.

The vacuum in the vacuum-proof collector substantially surrounds and insulates absorber 12 from all sides. There are no heat losses of absorber 12 to the top, to the bottom, or to the sides thereof. The flat construction of collector 12 contributes significantly to substantially improving the efficiency of the collector. That is, there are no overshadowing effects of absorber 12 even with an inclined incidence of the sun rays. If the heat becomes too intense or too high as in summer, the collector housing will be ventilated, the insulation of absorber 12 is suppressed and any surplus heat is exhausted to the atmosphere.

Thus, the primary advantage of a solar collector made in accordance with this invention is its adaptability to prevailing conditions of heat radiation and corresponding demand of heat by the consumer by changing the insulating effect of the vacuum inside the collector. The insulating effect may be completely neutralized at any time so that absorber 12 is no longer insulated to the outside. On the other hand, it is possible to apply a high vacuum to increase the insulating effect. A continuous regulation may be effected between the two extreme points by corresponding control of vacuum pump 36. As noted above, the double shell body of the collector may be open to the atmosphere thereby completely cancelling the effect of a vacuum. When increased insulation is required due to reduced solar radiation, vacuum pump 36 is put into operation and evacuation of the collector is effected. Operational losses of this type of an arrangement are extremely low due to possible abrupt changes of characteristics of the solar collector. Empirical data shows that the efficiency of the collector in the present invention is twice as high as that of known collectors.

Figure 6:
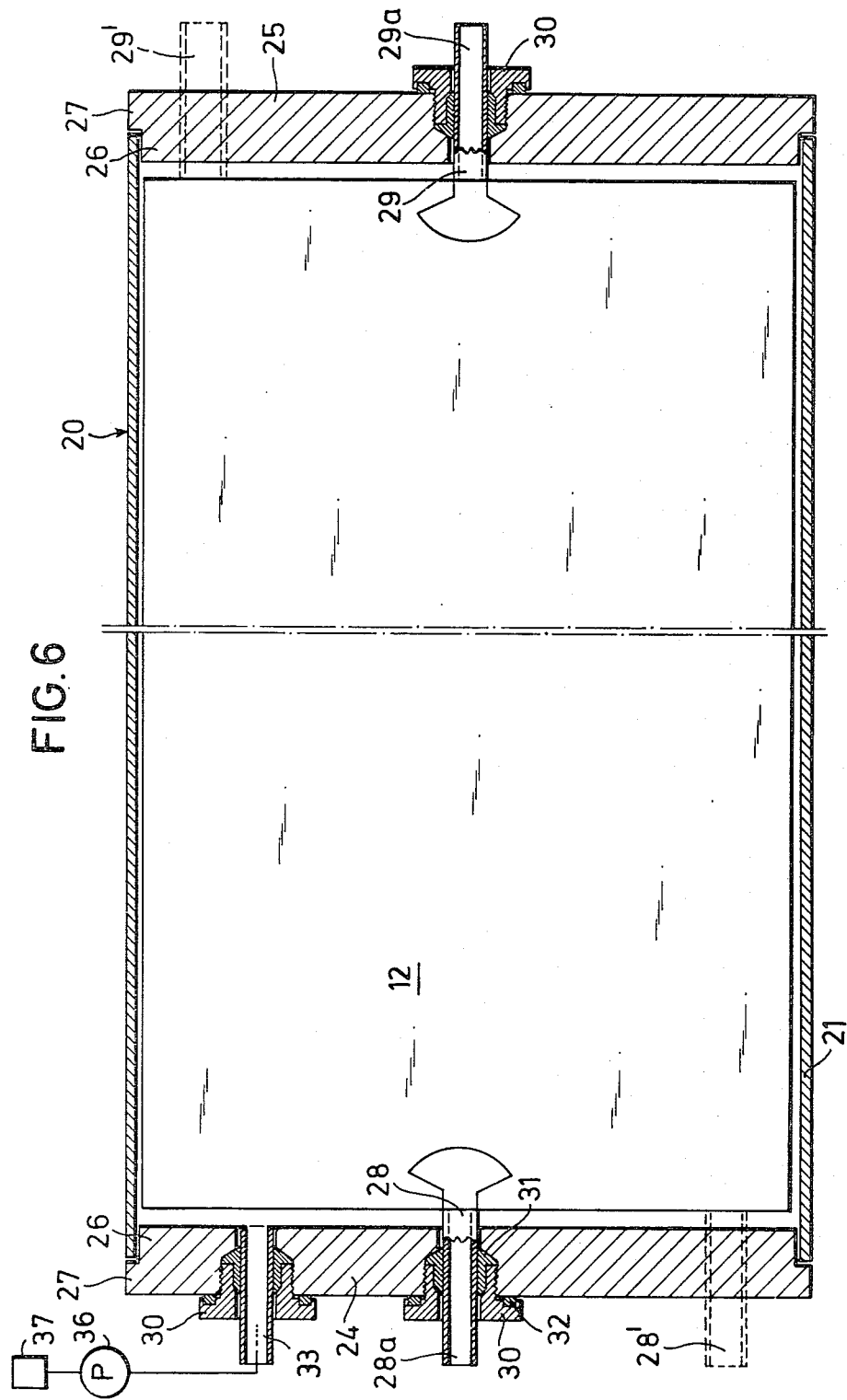
FIG. 6 is a longitudinal cross-section of another embodiment of a solar collector made in accordance with this invention.
Figure 7:
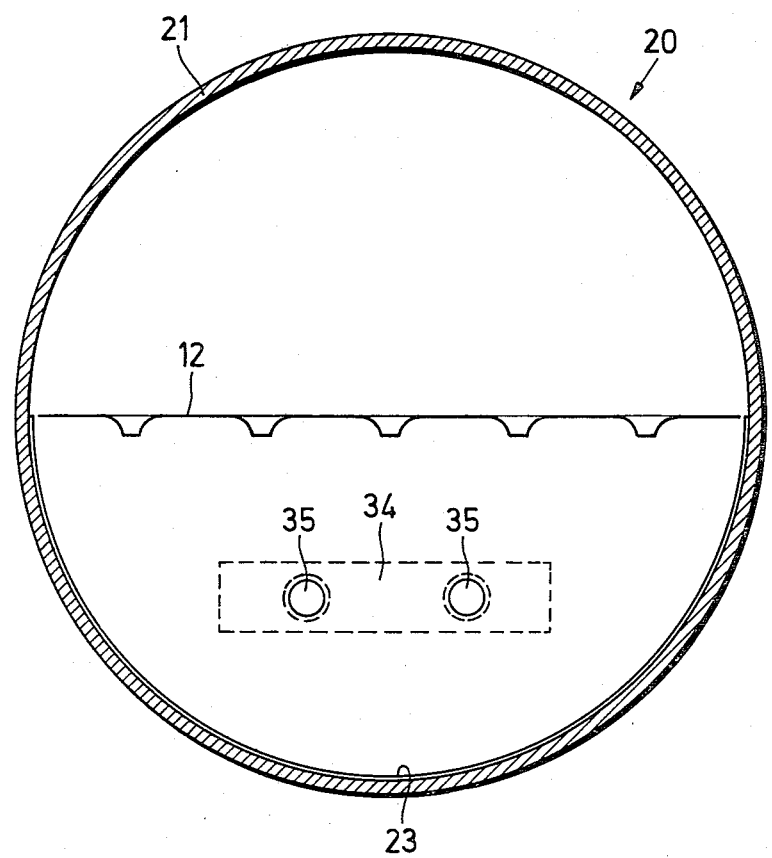
FIG. 7 is a cross-sectional view along a transverse plane of the solar collector as shown in FIG. 6.

A further embodiment of the invention is shown in FIGS. 6 and 7. The solar collector 20 comprises a cylindrical tube 21 composed of acrylic glass or any other transparent material resistant to weather. Tube 21 forms a housing for absorber 12 having a flat design and dimensions adapted to the interior of tube 21. Absorber 12 is disposed at substantially the longitudinal center of tube 21 to obtain the maximum width of absorber 12. In this embodiment, the top half of tube 21 is transparent so that the full solar radiation will act on the surface of absorber 12. An internal reflective coating 23 is disposed on the inside of the lower half of tube 21 as shown. Coating 23 is covered by a transparent protective varnish layer (not shown). An outer reflective coating may be used on the outside of the lower half of tube 21 which is turned away from the sun instead of the internal reflective coating 23. The lower half of tube 21 may be covered by a dark colored of protective varnish.

Circular front plates 24 and 25 may be made of acrylic glass or the like and close the two ends of tube 21. Each front plate 24 and 25 has a plug-type design with a plug portion 26 protruding into the end of tube 21 and another portion having a flange ring 27 resting against the outer edge of tube 21. Thus, front plates 24 and 25 form end covers which may be bonded to the ends of tube 21 or connected in any other desired form to establish a vacuum proof seal. When the solar collector 20 is under vacuum, the outer pressure on tube 21 urges the two balls against plug portion 26 to insure the tightness of the interior of tube 21. The plug portions 26 impart an internal supporting quality against the force exerted by the vacuum from inside tube 21. Apertures are located in each front plate 24 and 25 for effecting the connection of absorber 12 and vacuum pump 36. Absorber input 28 extends through the opening in plate 24 and absorber output 29 extends through the opening in front plate 25. Connecting pipes 28a and 29a protrude outside the respective front plates 24 and 25 and may be fitted with external threads, olive profile or the like (not shown). The apertures in plates 24 and 25 are located in the center thereof and in the same plane with absorber 12. Connecting pipes 28a and 29a extend through threaded bushings 30 which have sealing washers 31 and 32 which are composed of high temperature plastic material. Thus, a vacuum proof feed construction is effected with respect to the input and output connections 28 and 29, respectively. Threaded bushings 30 are extremely suitable when solar collector 20 is used for energy production. A potting compound such as molten acrylic glass may be used to seal input and output connections 28 and 29 when solar collector 20 is designed to operate at low temperatures.

Under certain circumstances, it may be advantageous to provide the input and output connections at a lateral position 28' and 29' respectively, rather than in the center of front plates 24 and 25. Connections 28' and 29' are also maintained in the plane of absorber 12 however.

A connecting pipe 33 is disposed in an additional aperture of front plate 24 to connect vacuum pump 36 to the inner chamber of tube 21. A threaded plug 30 mounts connecting pipe 33 in a vacuum proof manner. The specific location of connecting pipe 33 in front plate 24 is optional with respect to absorber 12. A control means 37 is used to maintain an automatic switching of the vacuum pump 36 on and off to change the vacuum in tube 21 and thus the insulation qualities of absorber 12 accordingly. As is evident as disclosed herein, control means 37 constitutes a heat or thermal radiation sensing device which is directly connected to a switch for the vacuum pump 36.

The tubular shape of solar collector 20 enables low cost construction through the use of standard elements requiring little expenditure as to tools. The large hollow space volume at both surfaces of absorber 12 provides excellent insulating effect even with the application of a low vacuum. Absorber 12 is mounted so that it may be introduced from one end of tube 12. An end wall portion integrally formed with the tube wall may be used in place of one end cover. Thus, only one front plate 24 or 25 will be used with the distribution of apertures therein provided accordingly. In either case, it is possible to fit all openings in one end cover only. Production can be facilitated further when all openings for connections are only provided in end covers while the tube jacket is free of any perforations.

With tube 21 free of any openings, there is no risk that fissures or breaks will form therein thereby jeopardizing the vacuum tightness of solar collector 20. Furthermore, there is no requirement for reinforced zones to be located in the tube jacket. Thicker material may be used in end plates 24 and 25 thereby facilitating the formation of holes therein through a simple and non-critical operation without concern of forming cracks.

With the absorber input 28 and output 29 disposed in the openings of end covers 24 and 25, respectively, the rigid mounting of absorber 12 is ensured. Solar collector 20 may be mounted vertically or in inclined standing position or horizontally or in an inclined lying position. Rotation of the tube 21 provides angular adjustment of absorber 12 about its longitudinal axis as disclosed herein. Thus, it is possible to adapt collector 20 to the conditions of radiation and to constructional and local prerequisites at the mounting site where necessary.

The tubular collector 20 offers relatively small surfaces of attack to wind when disposed in a horizontal assembly. Thus, the requirement for expensive holding mechanisms is eliminated. When in a vertical position, solar collector 20 may have a relatively small diameter so that it can be fitted very easily to the prevailing building conditions and in a constructional form which attracts no attention.

The wall thickness of tube 21 is sufficient to realize the maximum incidence of sun radiation therethrough on absorber 12 while maintaining sufficient stability due to its geometric cross-sectional design so that it may be suspended at both ends without an intermediate support. Additionally, the wall thickness must be sufficient for tube 21 so that it is sufficiently stable to withstand the vacuum existing inside collector 20.

A potting compound may be used to bond or consolidate the connection between tube 21 and front plates 24 and 25 to ensure a vacuum proof seal. As noted, the ends of tube 21 are reinforced internally by the plug portions 26. An axially symmetrical tube body may have an optional shape, e.g., one end at least may have a contracted neck configuration.

At least one of the two end plates 24 and 25 should be transparent in one partial zone. If necessary, the other end cover may have at least one partial zone with a reflective coating having a protective varnish thereon. The selection of the two types of end cover is dictated by the position of solar collector 20 when mounted in either a standing or lying position. It is imperative that a non-transparent end cover should not cause overshadowing or reflections on absorber 12. Thus, a transparent end cover should be used where the inclined incidence of sun rays are to impinge upon each point of the surface of the absorber 12 so that maximum output of the collector 20 is achieved.

As shown in FIG. 7, a strip 34 is mounted to the surface of front plates 24 and 25 within the reflected coating zone of tube 21. Strips 34 consist preferably of the same material as tube 21 to obtain an accommodation of the expansion behavior of the material. Strips 34 preferably extend in a direction parallel to the plane of absorber 12. Each strip 34 has several threaded bores 35 into which fixing bolts may be screwed for the assembly of solar collector 20 at a supporting frame construction.

As noted above, front plates 24 and 25 may be transparent to avoid overshadowing effects as shown in the drawings. Alternatively, one or both front plates 24 and 25 may have a reflective coating with a protective varnish at least in a partial area. This, of course, will depend upon the particular position of operation of solar collector 20. As further noted above, the openings in the end plates 24 and 25 may be fitted either in the center thereof or at opposite sides at the edges thereof. It is the purpose of such alternatives to exclude hydrostatic problems depending upon the position of solar collector 20. Such problems cause a decrease of efficiency of the solar collector and are brought about, for example, when the collector 20 is mounted in a lying position with the absorber 12 fitted at an angle with respect to the horizontal plane. Thus, the fluid current in the upper portion of absorber 12 is different from that in the lower portion. This difference is compensated by the eccentric arrangement of the input and output of the absorber 12. Both the central and offset positions of openings in end plates 24 and 25 are maintained in the plane of absorber 12 so that its assembly is facilitated by a straight extension of the absorber input and output lines through the openings. The connecting pipes 28a and 29b are attached by the threaded bushings of high temperature plastic when the collector 20 is operating at temperatures above about 120°. As already stated, potting material may be used to embed connecting pipes 28 and 29a when collector 20 is operating at lower temperatures.

Efficiency of solar collector 20 is further improved through the particular configuration of the absorber 12, details of which are more specifically shown in FIGS. 8 through 11. As shown, the absorber includes a bottom plate 41 turned away from the sun and a cover plate 42. Each of the plates 41 and 42 may be made of metal sheel material. A cavity is formed between the cover plate 42 and the bottom plate 41.

A plurality of circular bulges 43 are pressed into bottom plate 41 with a flat surface being contiguous to the cover plate 42. Bulges 43 are arranged in straight transverse rows extending in a direction parallel to the end edges 44 and 45 as shown. Consecutive rows of bulges 43 are offset with respect to each other so that the bulges 43 are transversely offset with respect to each other in the fluid flow direction. Thus, an interference point is always established after the rectangular channels 46 which are formed between two adjacent bulges 43 of any row. The interference point provides a positive whirling motion to the liquid flow through the absorber.

The working medium is a fluid which flows through the inlet 7 through the labyrinth of channels 46 to the outlet 48. The fluid is heated by the solar energy which is then converted into other forms of energy such as heat during the course of travel of the fluid through the absorber. The heated working fluid medium is removed from the absorber through outlet 48 and fed to any desirable place thereafter.

The fluid medium entering inlet 47 first gets to a fluid collecting zone 49 which extends across the absorber ahead of the first row of bulges 43. The fluid is distributed from the fluid collector zone 49 into the channels 46 to form several small fluid currents. The bulges 43 symmetrically arranged on the bottom plate 41 effect this condition of fluid flow. The fluid medium which flows around the first row of bulges 43 takes up the heat generated in this zone by solar radiation. The channels 46 unite after the first row of circular bulges 43 and form a common fluid current in a larger triangular zone 50 having a larger volume. One side of the triangular zone of confluence is already formed by the next row of circular bulges 43. A whirl is formed in the fluid medium by the confluence of two partial currents each in one of the nearly triangular zones 50. This whirl continues to develop as it moves into the following constricted channels 46 formed between subsequently disposed consecutive rows of bulges 43.

The whirl formation decreases to a large extend in the channels 46 between the bulges 43 of the consecutive channels. However, the whirl formation is revived again with the confluence of the individual partial currents after the second row of bulges 43 and each consecutive row thereafter. The fluid medium takes up the heat generated in each of the zones by solar radiation as it moves between the consecutive rows of bulges 43 through the constricted channels 46. The whirling principle continues to work in different modes within the total absorber and is analagously applicable to all channels 46 and zones of confluence 50. A large amount of turbulence is effected in the zones of confluence 50 and thereby causes an improved heat transfer to the working fluid medium and an increase in efficiency of the absorber.

Thus, this construction of the absorber causes the current of liquid to be distributed by branching into partial currents so that highly turbulent zones are formed over the total surface of the absorber. Due to the narrow channels between adjacent interference points of a first group of interference points, the working fluid medium is first subdivided into several small currents where it takes up a large amount of heat generated in the absorber zone. After the first interference points have been surrounded by the flow, any two partial currents of liquid unite to form one common fluid current in a channel zone of a greater volume. A vortex is created in the channel zones and will penetrate into the subsequent channels of reduced cross-section between the interference points of another subsequent group thereof.

The efficiency of the absorber made in accordance with this invention is more than 10% higher than that of known absorbers. The simple construction of the absorber as disclosed herein permits an inexpensive production thereof. The particular absorber structure establishes an optimum turbulent current which is produced and maintained purposefully over the total surface of the absorber. The resulting heat delivery is substantially quicker and better thereby establishing a greater efficiency of operation than any absorber having other known geometrical configurations.

As discussed above, the collecting zone 49 serves to relieve the absorber input 47 of any jamming effects.

Further, while the circular bulges 43 as illustrated in the drawing are very advantageous, the selected arrangement, dimension and relationship of other forms of interference points may be chosen. For example, the bulges 43 may have a rectangular design to achieve an angular flow in the working fluid medium. Furthermore, rather than press profiles in the bottom plate 41, individual bodies may be fitted and distributed so as to insure that the principle of the whirling of fluid medium by using narrowed channels ending in enlarged and branching zones of confluence is maintained.

While the solar collector assembly and process for operating same has been shown and described in detail, it is obvious that this invention is not to be considered as being limited to the exact form disclosed, and that changes in detail and construction may be made therein within the scope of the invention, without departing from the spirit thereof.

I claim:

1. A solar collector assembly comprising:
   (a) a hollow housing at least partially transparent to solar rays,
   (b) absorber means disposed in the housing to receive said solar rays,
   (c) vacuum pump means connected to maintain a normally vacuum insulating effect around the absorber means inside of the housing, (d) means for sensing the heat radiation of prevailing ambient atmospheric conditions, and
(e) switching means responsive to said sensing means to turn off the vacuum pump means and ventilate to completely neutralize said insulating effect.

2. An assembly as defined in claim 1 wherein
said absorber means includes an inlet and an outlet,
the hollow housing is a tube having opposed ends closed with end covers in a vacuum-proof manner,
the end covers include apertures for inlet and the outlet which are located substantially in the tube center and one of the apertures for connection of the vacuum pump means.

3. An assembly as defined in claim 2 wherein
the one end cover includes apertures for the absorber inlet and the connection of the vacuum pump means, and
the other end cover has an opening for the absorber outlet.

4. An assembly as defined in claim 2 wherein
three openings are formed in one end cover.

5. An assembly as defined in any one of the claims 2 to 4 wherein
the openings for the absorber inlet and outlet are located in the center of the end covers.

6. An assembly as defined in any one of the claims 2 to 4 wherein
the openings for the absorber inlet and outlet are located at opposite sides at the edge of the end covers.

7. An assembly as defined in any one of the claims 2 to 4 wherein
connecting pipes are positioned in a vacuum proof manner and protruding to the outside of said openings.

8. An assembly as defined in claim 7 wherein
the connecting pipes are fastened by potting material or the like in the end cover openings in a vacuum-proof manner.

9. An assembly as defined in claim 7 wherein
the connecting pipes are secured in the end cover openings in a vacuum-proof manner with a threaded plug and seals made of a high temperature resistant plastic.

10. An assembly as defined in any one of the claims 2 to 4 wherein
at least one strip is secured on the outer surface of the two end covers,
each said strip includes threaded bores to receive bolts for mounting the assembly.

11. An assembly as defined in any one of the claims 2 to 4 wherein
the end covers of the two tube ends comprise front plates mounted in a vacuum-proof manner.

12. An assembly as defined in any one of the claims 2 to 4 wherein
the one end cover comprises a formed wall portion of the tube, and the other end cover comprises a front plate inserted in a vacuum-proof manner into the opposed end of the tube.

13. An assembly as defined in claim 11 wherein
each front plate is a disk fitted to project into the tube and having one flange ring resting against the outer edge of the tube.

14. An assembly as defined in claim 11 wherein
the front plates are made of a transparent material and are bonded to the tube ends in a vacuum-proof manner.

15. An assembly as defined in claim 12 wherein
at least one of the two end covers is transparent at least in a partial zone.

16. An assembly as defined in claim 12 wherein
at least one of the two end covers includes at least one partial zone having a reflective coating with a protective varnish layer.

17. An assembly as defined in claim 12 wherein
the tube is axially symmetrical, preferably cylindrical and made of glass, acrylic glass or another transparent material.

18. An assembly as defined in claim 12 wherein
the tube has an internal or outer reflective coating with protective varnish layer on one longitudinal half.

19. An assembly as defined in claim 18 wherein the protective varnish layer of the internal reflective coating is transparent.

20. An assembly as defined in claim 18 wherein
the protective varnish layer of the outer reflective coating is of a dark color.

21. A solar collector assembly comprising:
(a) a hollow housing at least partially transparent to solar rays,
(b) absorber means disposed in the housing to receive said solar rays,
(c) vacuum pump means connected to the housing to evacuate the inside of the housing,
(d) means for sensing the heat radiation of prevailing ambient atmospheric conditions, and
(e) means responsive to said sensing means to automatically control the vacuum pump means and thereby adjust vacuum within the housing in response to changes in prevailing atmospheric conditions,
(f) said hollow housing comprises a shell-shaped curved bottom portion connected in a vacuum-proof manner with a shell-shaped curved cover portion.

22. An assembly as defined in claim 21 wherein
a cavity including fluid channels formed between a cover plate and a bottom plate and extending from an end-side input to an end-side output,
said cavity including a plurality of local interference points in a fixed relationship to rectangular fluid channels,
said interference points being transversely offset with respect to each other in the fluid direction and being effective to positively whirl up the fluid flow.

23. An assembly as defined in claim 21 wherein
the cup curvatures of the bottom portion and of the cover portion are shallow.

24. An assembly as defined in claim 21 wherein
the double shell-body has a substantially symmetrical lancet cross-sectional shape.

25. An assembly as defined in any one of the claims 21 to 24 wherein
the bottom portion and the cover portion are made of glass, acrylic glass, or another transparent material.

26. An assembly as defined in any one of the claims 21 to 24 wherein
the bottom portion is made of metal and the cover portion is made of glass, acrylic glass or another transparent material.

27. An assembly as defined in any one of the claims 21 to 24 wherein a reflective coating is disposed on the inner face of the bottom portion.

28. An assembly as defined in any one of the claims 21 to 24 wherein
the bottom portion and the cover portion include reinforcing ribs at their inner surface, and
a groove pointing to the top is located along the edge of the bottom portion.

29. An assembly as defined in any one of the claims 21 to 24 wherein
the bottom portion includes an edge having an under side with a straight design without a curvature to form a supporting edge.

30. An assembly as defined in any one of the claims 21 to 24 wherein
the absorber means includes an inlet and an outlet, and
the bottom portion has at both ends one opening each for said inlet and outlet and another opening for connection of the vacuum pump means.

31. A process for operating a solar collector including a hollow housing containing an absorber, and said housing being connectd to a vacuum pump, said process comprising:
(a) maintaining a normally vacuum insulating effect around the absorber disposed inside of the housing,
(b) sensing heat radiation existing in prevailing ambient atmospheric conditions,
(c) switching off the vacuum pump for ventilating the inside of the housing to completely neutralize said insulating effect in the housing in response to the amount of heat radiation determined in the sensing step, and
(d) said switching off step of the vacuum being effective to control the efficiency of the function of the absorber.

* * * * *